UNITED STATES PATENT OFFICE.

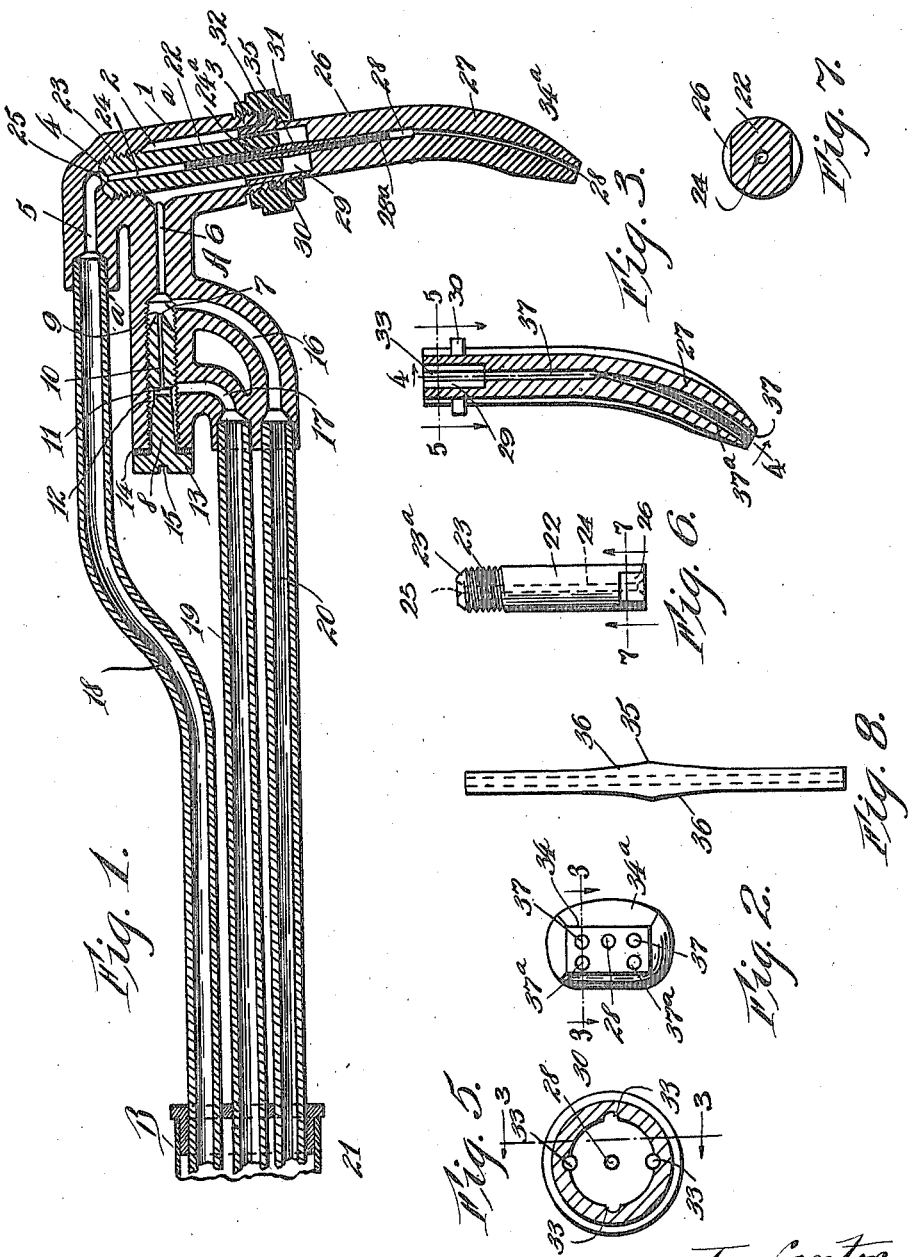

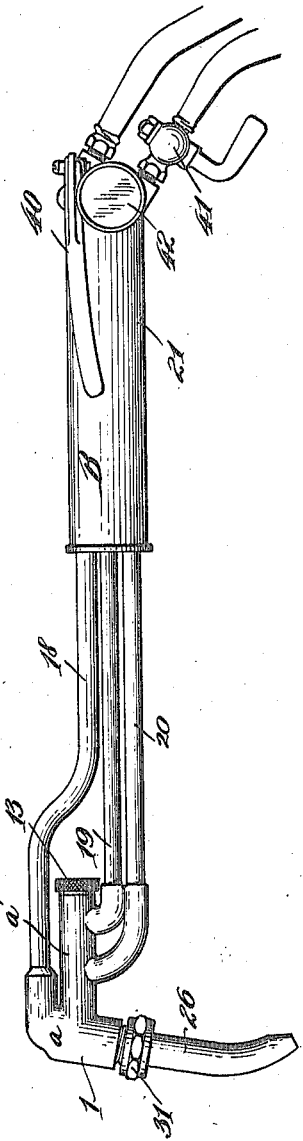
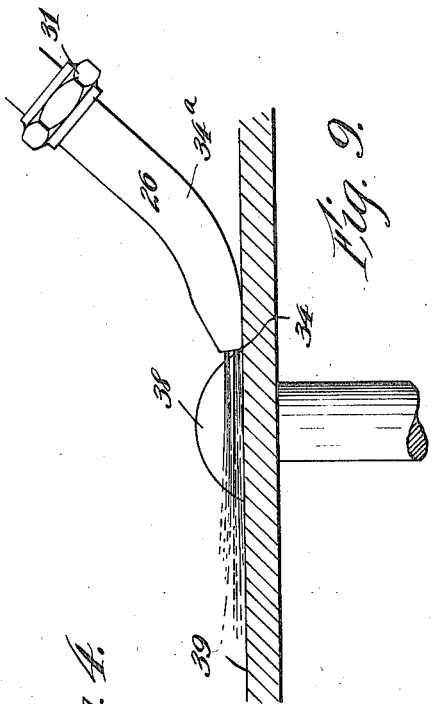
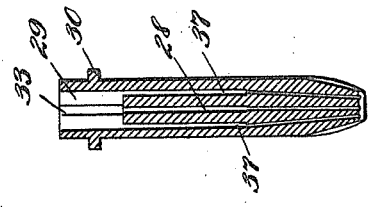

JAMES R. ROSE, OF EDGEWORTH, PENNSYLVANIA.

APPARATUS FOR CUTTING METAL.

1,233,706.  Specification of Letters Patent.  Patented July 17, 1917.

Application filed July 15, 1915. Serial No. 39,936.

*To all whom it may concern:*

Be it known that I, JAMES R. ROSE, a citizen of the United States, residing at Edgeworth, in the county of Allegheny and State of Pennsylvania, have invented a certain new and useful Improvement in Apparatus for Cutting Metal, of which the following is a full, clear, and exact description, reference being had to the accompanying drawings.

This invention relates to an apparatus (in the form of a torch or blow-pipe) whereby metal is cut by means of oxygen. The use of oxygen for the purpose of cutting metal which is preheated, either by supplying an excess of oxygen to a flame produced by the uniting of the oxygen with some other combustible gas or by directing a separate jet of oxygen against metal which is heated by or from a separate source, has been employed for many years. In the art, as it existed prior to my invention, it has been found difficult, if not practically impossible, to limit the zone of action of the cutting jet. This has been particularly true where attempts have been made to cut projections from a metal body or plate without injuring the body or plate and without leaving burs or projections above the same. By my apparatus or torch, I am enabled to remove such projections as rivet-heads protruding from the surfaces of boiler plates, steel cars, and the like, without cutting or digging into the bodies of the plates on the one hand and without leaving the burs or projections which heretofore have resulted from the attempts to avoid such cutting or digging.

In realizing my invention I prefer to use a torch or blow-pipe such as shown in the drawings hereto annexed, wherein Figure 1 is a longitudinal sectional view taken through the blow-pipe or torch proper and the tubes leading thereto; Fig. 2 is a bottom plan view of the tip of the blow-pipe or torch; Fig. 3 is a longitudinal sectional view taken through the lower member of the tip, along the line 3—3 of Fig. 2; Fig. 4 is a longitudinal sectional view corresponding to the line 4—4 of Fig. 3; Fig. 5 is an enlarged sectonal view corresponding to the line 5—5 of Fig. 3; Fig. 6 is a side elevation of the upper member of the tip; Fig. 7 is a sectional view corresponding to the line 7—7 of Fig. 6; Fig. 8 is an enlarged detail in elevation of the tubular stem which connects the upper and lower tip members and which forms a passageway for the supply of oxygen therethrough, the taper of the central portion of the stem being exaggerated for clearness of illustration; Fig. 9 is a view illustrating the action of my torch or apparatus in removing a rivet-head from a metal plate; and Fig. 10 is a side elevation of the torch, showing the location of the gas controlling valves.

Describing by reference characters the various parts illustrated in the drawings, A denotes the head of a blow-pipe or torch and B the handle therefor. The head A comprises a body provided with two branches $a$ and $a'$ extending at an angle to each other. The branch $a$, in the operation of the torch or blow-pipe, extends toward the article to be cut, while the branch $a'$ extends at nearly right angles from the branch $a$. For convenience of description, it will be assumed that the plate from which the projections are to be cut is located below a blow-pipe or torch, and the terms "top" and "bottom" will be used accordingly. The branch $a$ of the head comprises an annular shell 1 having a chamber 2 extending upwardly from the lower end thereof and provided at such lower end with a threaded reduced portion 3. The upper end of the chamber 2 is contracted and provided with an internally threaded portion and with a conical seat 4 above such threaded portion, said conical seat being provided with an opening therethrough registering with a passageway 5 which is provided in the branch $a'$ of the head.

The branch $a'$ (with the parts arranged as shown in the drawing) has the passageway 5 therein and a passage way 6 extending to and communicating with the upper portion of the chamber 2. The rear end of the passageway 6 communicates with the chamber 7, which is internally threaded for the reception of a plug 8 having a nozzle 9 at the front end thereof and a reduced bore 10 extending from the front end to a transverse bore 11 which communicates at its opposite ends with a recess in the plug forming, with the wall of the chamber 7 an annular receiving chamber 12. The rear or outer end of the plug 8 is provided with a head 13, suitable packing material 14 being interposed between said head and the adjacent portion of the branch a'. For convenience of manipulation, the plug 8 is provided with a slit 15 which is adapted to receive a screwdriver. The front end of the chamber 7, in front of the nozzle 9, is provided with a passageway 16 extending downwardly and rearwardly, and a passageway 17 extends in like manner from the annular receiving chamber 12.

A tube 18 extends rearwardly from the passageway 5 and conducts oxygen thereto. A tube 19 extends rearwardly from the passageway 17 and serves to conduct oxygen thereto, while a tube 20 extends rearwardly from the passageway 16 and serves to conduct a suitable combustible gas thereto. The tubes 18, 19 and 20 extend to a common casing 21 constituting the handle proper, the tubes being provided with proper controlling valves whereby a combustible gas and oxygen may be supplied to the passageways 16 and 17, respectively, to produce one or more preheating jets, while oxygen may be supplied, when desired, through the tube 18 (and the tip to be described hereinafter) to the preheated metal. The valve arrangement for controlling the passage of gases through the tubes 18, 19 and 20 may be the same as shown and described in the application of John Harris No. 877,649 filed December 17, 1914, the blow-pipe or torch-head as thus far described being substantially identical with that shown and described in such application.

Coöperating with the head and with the pipes and valves thus referred to is a special tip which is peculiarly adapted, in connection with the head and the gas-supplying devices, to realize my process. The tip comprises generally an inner and an outer member or section which, although detachably connected together, constitute in effect a single tip. The upper member consists of a cylindrical body 22 having its upper portion threaded, as shown at 23, and provided with a tapered or frusto-conical end 23$^a$, which threaded portion and end coöperate with the threaded portion of the shell 1 and the tapered seat 4. The body 22 is provided with a central passageway 24, the upper end whereof is enlarged, as shown at 25, whereby it substantially registers with the discharge end of the passageway 5. The lower end of the member 22 extends somewhat below the lower end of the shell 1 and has its opposite sides flattened, as shown at 26, for the reception of a tool whereby the upper tip member may be conveniently applied to and removed from its seat within the burner shell or head. The lower or outer member of the tip comprises a body 26 the lower portion 27 whereof is bent or deflected so as to form an angle with the portion 26. The body is provided with a central passageway 28, the body being bored first and afterward bent to the angular shape shown in the drawing. The passageway 28 communicates at its upper end with an enlarged chamber 29 within the upper part of the body 26, and this chamber is provided with an outwardly projecting flange 30 below the top of the tip body. This flange provides means whereby this body may be secured to the lower end of the annular shell 1, said means being shown as comprising a gland nut 31 having a flange extending beneath the flange 30, said nut being applied to the threaded end 3 of the shell 1. Packing 32 may be inserted between the flange 30 and the bottom of said shell wall.

It will be observed that the chamber 29 is of sufficiently greater diameter than the diameter of the body 22 to provide, between the lower end of said body and the chamber, an annular passageway for the mixture of oxygen and combustible gas which is to supply the preheating jet or jets. In assembling, it may happen that the lower end of the body 22 will not be centered with respect to the upper body 26, thus interfering with the supply of oxygen and combustible gas to the chamber 29. To prevent such interference with the gas supply, I provide the inner wall of the chamber 29 with a plurality of vertically extending scores or recesses 33. In Fig. 5, I have shown four such recesses, two of which may constitute extensions of passageways extending through the tip section 26 on each side of the central passageway 28. It will be observed that the bore 28 is centrally arranged with respect to the body 26 in one plane, but that it is so deflected in another plane that its discharge end is closely adjacent to one edge 34 of the tip end, the tip end being shown as rectangular. In fact, the discharge end of the oxygen passageway will be located as close as possible to this edge of the discharge end of the tip. The upper end of the passageway 28 is tapered, as indicated at 28$^a$, and the lower end of the passageway 24 is also tapered, as indicated at 24$^a$. The two tip sections are connected and their bores placed in communication by means of an interposed tubular stem, shown particularly in Figs. 1 and 8. This tubular inner stem has a driven, swaged fit within the lower part of the passageway 24 and within the upper part of the passageway 28, being tapered by being enlarged at its center (as shown in an exaggerated degree at 35), and gradually diminishing in cross sectional area on each side of this enlargement, as shown at 36, the tapered portions corresponding to and forming a close driving connection with the corresponding tapered parts 24ᵃ and 28ᵃ of the bores 24 and 28. This construction enables the two tip sections to be assembled and disassembled and provides a leak-proof connection between their bores.

In forming two of the recesses 33 in the wall of the chamber 29, the drill, after forming such segmental recesses, may be continued into the body of the lower tip section thereby forming a pair of passageways 37. These passageways will preferably be formed in substantially the same plane as the passageway 28, whereby the outlet or discharge ends of the three passageways 28 and 37 will be in substantially the same plane and parallel to and as close as possible to the edge 34 of the lower end of the tip section 26. It is an important feature, in carrying out my invention, that the preheating means be employed, not only on each side of the central oxygen jet, but above the plane of such jet. In order to provide such additional preheating means, each passageway 37 is branched near its lower end whereby branch passageways 37ᵃ extend through the lower end of the tip section 26, the discharge ends of said branch passageways (assuming the torch to be used upon a rivet head or other projection extending upwardly from a plate) being located above the discharge ends of the passageways 37 and in a plane parallel with the plane of the discharge ends of the passageways 28 and 37.

For convenience of manipulation, the lower end of the tip section 26 is beveled gradually away from the edge 34, as shown at 34ᵃ, thereby enabling the tip to be supported with this beveled face resting upon the metal plate and in position to direct the pre-heating jets discharged through the passageways 37 and the oxygen jet discharged through the passageway 28 against the rivet head (or other projection) as closely as practically possible to the line of junction between the rivet head and the plate. As previously stated, the boring of the passageways 28 and 37, 37ᵃ will be accomplished before the bending of the lower tip section 26; and this boring may conveniently be performed by employing two drills for each passageway, the drill for the lower portions of the passageways being smaller than that used in boring the upper portions.

The manner of connecting the tip to the head makes the torch extremely convenient of operation. The upper tip section having been secured in place, the lower section is applied thereto and is turned to whatever direction may be desirable; the tubular stem may be applied to either one of the two tip sections before the assembling operation and inserted into the other tip section when the sections are assembled. The gland nut serves to retain the two parts of the tip in operative relation to each other. If it is desired to change the angle of the lower section with reference to the head, this may be readily accomplished by merely slacking up on the gland nut, turning the lower section to the desired position, and then setting up on the nut.

In Fig. 9 I have shown the position of the lower section of the tip and of the passageways thereof to the metal plate and to the projection (rivet head) during the cutting operation. By arranging the preheating jets at each side of the oxygen jet and closely adjacent to the face 34ᵃ, the cutting of the rivet or other projection 38 may be accomplished in a plane substantially coincident with the plane of the junction of the projection and the metal plate 39. Using only a pair of preheating jets in the plane of the oxygen jet does not result in softening the metal below the cutting plane, as the preheating thus accomplished is insufficient to secure such result; the upper tier of preheating jets, however, coöperating with the lower tier, serves to soften the metal above this cutting plane, with the result that the yielding or giving of the metal under the action of the oxygen jet will occur above this cutting plane only and within the upper preheated region. I am thus enabled to obtain a clean cut practically coincident with the plane of junction of the projection and the metal plate, and without injury to the parts beneath the cut, the preheating of the metal in the plane above the cutting plane setting up above such cutting plane the conditions necessary to secure this result; in other words, there is provided above the oxygen jet and above the desired cutting line or plane all the softened metal that is necessary to enable the oxygen to perform its cutting operation and without striking down or affecting the metal in the projection or rivet and in the plate beneath such line or plane. This enables me to bring the lower line of openings closer to the bottom of the tip than has heretofore been considered practicable and hence to direct the jets from these openings against the rivet or projection at substantially the junction of the same with the plate.

In Fig. 10 I have shown the torch or blowpipe in side elevation and have indicated thereon the valves which serve to conduct oxygen and combustible gases to the tubes 18, 19 and 20. The valve for the oxygen tube 18 is indicated at 40, while 41 and 42 indicate, respectively, the valve controlling the supply of combustible gas to the pipe 20 and that controlling the supply of oxygen to the pipe 19, the valves shown herein being substantially identical with those set forth in the Harris application aforesaid.

The process which is realized in and through the operation of the torch or blow pipe thus described forms the subject matter of a divisional application No. 65,955 filed December 9, 1915.

Having thus described my invention, what I claim is:

1. A cutting torch comprising a tip having a central passageway, a passageway on each side of the central passageway and in substantially the same plane as said central passageway, and a pair of passageways in a plane spaced from the two last mentioned passageways, and connections for supplying oxygen to the first mentioned passageway and combustible gases to the four last mentioned passageways, there being no passageways on the side opposite the last mentioned pair of passageways whereby the preheating will be correspondingly limited.

2. A cutting torch comprising a tip having a supporting face adapted to be applied to an object and having closely adjacent to said face a central passageway and a passageway on each side of said central passageway, said tip being provided with a pair of passageways located in a plane substantially parallel with the supporting surface of the tip and above the first mentioned passageways, and connections for supplying oxygen to the first mentioned passageway and combustible gases to the remaining passageways.

3. A torch comprising a tip having a supporting face adapted to be applied to an object and having closely adjacent to said face a central passageway and a passageway on each side of said central passageway, said tip being provided with a pair of passageways located each in substantially the same vertical plane as one of the last mentioned passageways and in a plane substantially parallel with the supporting surface of the tip and above the plane of the first mentioned passageways, and connections for supplying oxygen to the first mentioned passageway and combustible gases to the remaining passageways.

4. A torch comprising a tip having a central passageway and a passageway on each side of said central passageway, said tip being provided with a pair of passageways located each in substantially the same vertical plane as one of the last mentioned passageways and in a plane substantially parallel with the plane of the first mentioned passageways, and connections for supplying oxygen to the first mentioned passageway and combustible gases to the remaining passageways.

5. In a blow pipe or torch, the combination of a head having a centrally arranged passageway and a seat in front of said passageway and gas supply connections leading to said passageway and to a chamber in said head in front of said seat, an inner tip section of smaller diameter than the internal diameter of said chamber and removably secured to said seat and having a passageway therethrough adapted to register with the first passageway, an outer tip section having a chambered end adapted to be inserted within the chamber of the head and having a passageway arranged to register with the passageway in the inner tip section, a tubular stem having a driven or swaged fit in the passageways of said tip sections, the outer tip section having passageways therethrough adapted to communicate with the chamber in the end of the outer tip section, and means for removably securing the outer tip section to the head.

6. In a blow pipe or torch, the combination of a head having a chamber, a tip section of smaller diameter than the internal diameter of said chamber and removably secured to said head and having a passageway therethrough, a second tip section having a chambered end adapted to be inserted within the chamber of the head and having a passageway arranged to register with the passageway in the first tip section, a tubular stem connecting the passageways of said tip sections, the second tip section having passageways therethrough adapted to communicate with the chamber in the head, means for removably securing the second tip section to the head, and connections for supplying gases to the chamber of the head and to the passageway of the first tip section.

7. In a torch or blow pipe of the character described, the combination, with a head having a centrally arranged passageway, an interiorly threaded seat in front of said passageway, and gas supply connections leading to said passageway and to a chamber in front of said seat, of a removable tip section having a passageway therethrough adapted to register with the first passageway and provided with an external thread whereby it may be detachably secured to said seat, the lower or outer end of said section being shaped to receive an operating tool, a second tip section having a passageway adapted to register with the passageway in the first section, a tubular stem adapted to be inserted into the passageways of said tip sections thereby to connect the same, the second tip section having its lower or discharge end extending at an angle with respect to its upper end, and means rotatably connecting the second tip section to the head, the second tip section being provided with one or more additional passageways therethrough communicating with the chamber in the head.

8. In a torch or blow pipe of the character described, the combination, with a head having a plurality of gas supplying passageways, of a tip section having a passageway therethrough adapted to register with one of the first mentioned passageways, a second tip section having a passageway adapted to register with the passageway in the first section, a tubular stem adapted to be inserted into the passageways of said tip sections thereby to connect the same, means connecting the second tip section to the head, the second tip section being provided with one or more additional passageways therethrough communicating with the other passageway in the head, and means for connecting the last mentioned tip section to the head.

9. In a burner or torch of the character described, the combination of a head, a tip section detachably connected to said head and having a passageway therethrough the lower or discharge end whereof is tapered, a second tip section having a passageway therethrough the upper or receiving end whereof is tapered, a tubular stem having its opposite ends inserted in said passageways and having tapering surfaces coöperating with the tapered portions of such passageways, and means for detachably connecting the second tip section to the head.

10. In a burner or torch of the character described, the combination of an inner tip member having a passageway therethrough the lower or discharge end whereof is tapered, an outer tip member having a passageway therethrough the upper or receiving end whereof is tapered, a tubular stem having its opposite ends inserted in said passageways and having tapering surfaces coöperating with the tapered portions thereof, and means for detachably connecting the outer tip member to the head.

11. A tip comprising a pair of sections each having a tapered passageway, and a tubular stem having tapered portions adapted to fit the corresponding tapered portions of said passageways.

12. A tip comprising a pair of longitudinally spaced sections each having a passageway therethrough, and a tubular stem adapted to be fitted into said passageways thereby to connect the same.

13. A tip comprising a pair of sections each having a tapered passageway therethrough, a tubular stem adapted to fit in the corresponding tapered portions of said passageways, one of the tip sections being provided with means whereby it may be detachably connected to the head of the torch or burner and the other tip section having means whereby it may be detachably connected to such head.

14. In a burner or torch of the character described, the combination, with a head having a passageway, a seat in front of said passageway, a chamber in front of said seat, and a passageway communicating with said chamber, of an inner tip section having a passageway therethrough and detachably connected to the head in front of the first mentioned passageway thereof and extending through and spaced from the walls of said chamber, said tip section being shaped at its outer end to receive a tool whereby it may be applied to and removed from the seat in said head, an outer tip section having a chambered upper end and a flange projecting from such chambered end, the chambered end of the second tip section being adapted to receive therewithin the outer end of the first tip section and said second tip section being provided with a passageway therethrough adapted to register with the passageway in the first tip section, a tubular stem fitting within and connecting the passageways in said tip sections, the second section being provided with one or more additional passageways communicating with the chamber in the end thereof, and a gland nut adapted to engage said flange and threaded onto the outer end of said head.

15. In a burner or torch of the character described, the combination, with a head having a passageway, a seat in front of said passageway, a chamber in front of said seat, and a passageway communicating with said chamber, of a tip section having a passageway therethrough and detachably connected to the head in front of the first passageway and extending through and spaced from the walls of said chamber, said tip section being shaped at its outer end to receive a tool whereby it may be applied to and removed from the seat in said head, a second tip section having a chambered upper end adapted to receive therewithin the lower end of the first mentioned tip section and said second tip section being provided with a passageway therethrough adapted to register with the passageway in the first tip section, a tubular stem fitting within and connecting such tip-section passageways, the second section being provided with one or more additional passageways communicating with the chamber in the end thereof, and means connecting the second section to the outer end of said head.

16. In a burner or torch of the character described, the combination, with a head having a passageway, a seat in front of said passageway, a chamber in front of said seat and gas supply connections leading to said passageway and to said chamber, of a removable tip section having a passageway therethrough and removably secured to said seat, a second tip section adapted to telescope over the lower end of the first section, the second tip section having its lower end directed at an angle with respect to its upper end and provided with a passageway therethrough registering with the passageway in the first section, a tubular stem fitting within and connecting such tip-section passageways, the second section being provided with one or more additional passageways communicating with the chamber in the end thereof, and means rotatably connecting the second section to the head.

17. In a burner or torch of the character described, the combination of a head, a tip connected to said head and having a central passageway and a passageway on each side of the central passageway, the last mentioned passageways having outlets in substantially the plane of the central passageway and each being branched whereby additional outlets are provided which are spaced from the first mentioned outlets, and connections for supplying oxygen from the head to the first mentioned passageway and a mixture of combustible gases to the other passageways.

18. In a burner or torch of the character described, the combination of a head, a tip connected to said head and having a central outlet and an outlet on each side of the central outlet and in substantially the plane of the central outlet and also having outlets within a plane spaced from the first three outlets, and connections for supplying oxygen from the head to the first mentioned passageway and a mixture of combustible gases to the other passageways, there being no passageways on the side opposite the last mentioned pair of passageways whereby the preheating will be correspondingly limited.

19. The combination, with the head of a burner or blow pipe of the character described, of a tip section rotatably connected to said head, said tip section having its lower portion extending at an angle with respect to its upper portion and provided with a passageway extending therethrough and with passageways arranged on each side of the first mentioned passageway, the last mentioned passageways being branched at their lower ends whereby each is provided with two discharge outlets, and connections for supplying oxygen from the head to the first mentioned passageway and a mixture of oxygen and combustible gases to the other passageways.

20. The combination, with the head of a burner or blow pipe of the character described, said head having a passageway, a seat in front of said passageway, a chamber in front of said seat and gas supply connections extending to said passageway and to said chamber, of a tip section removably fitted in said seat and having a passageway therethrough adapted to register with the first mentioned passageway, a second tip section removably connected to the end of the head and having a chamber at its upper end adapted to receive therewithin the lower end of the first tip section and having a passageway therethrough registering with the passageway in the first section, a tubular stem within and connecting such tip-section passageways, the second tip section being provided with one or more additional passageways extending from the chamber to the lower end thereof, the inner wall of the chamber of said second tip section being provided with one or more additional passageways whereby the said chamber will always be in communication with the chamber in the head.

21. The combination, with the head of a burner or blow pipe of the character described, said head having a passageway, a seat in front of said passageway, a chamber in front of said seat, and gas supply connections extending to said passageway and to said chamber, of a tip section removably fitted in said seat and having a passageway therethrough adapted to register with the first mentioned passageway, a second tip section removably and rotatably connected to the end of the head and having a chamber at its upper end adapted to receive therewithin the lower end of the first tip section and having a passageway therethrough registering with the passageway in the first section, and a tubular stem within and connecting such tip-section passageways, the second tip section being provided with one or more additional passageways extending from the bottom of the chamber therein to the lower end thereof and with one or more additional passageways in the wall surrounding and forming such tip-section chamber whereby the last mentioned chamber will be in communication with the chamber in the head, each recess registering with a passageway extending through the second tip section.

In testimony whereof, I hereunto affix my signature in the presence of two witnesses.

JAMES R. ROSE.

Witnesses:
 JOHN HARRIS,
 ROBERT L. BRUCK.